| United States Patent [19] | [11] | 4,419,537 |
|---|---|---|
| Leep et al. | [45] | Dec. 6, 1983 |

[54] ELECTRICAL WIRING BOX ARRANGEMENTS

[75] Inventors: Oral F. Leep, Vienna; Vernon D. Dellinger, Parkersburg, both of W. Va.; Claude J. Bauer, Belpre, Ohio

[73] Assignee: GTE Products Corporation, Stamford, Conn.

[21] Appl. No.: 359,346

[22] Filed: Mar. 17, 1982

[51] Int. Cl.³ .............................................. H02G 3/08
[52] U.S. Cl. ............................... 174/65 R; 339/103 R
[58] Field of Search ............ 174/65 R; 285/128, 129; 339/103 R, 103 M; 248/56

[56] References Cited

U.S. PATENT DOCUMENTS

| 3,084,958 | 4/1963 | Appleton | 174/65 R X |
| 3,788,582 | 1/1974 | Swanquist | 248/56 |
| 4,223,178 | 9/1980 | Lass | 174/65 R |
| 4,277,641 | 7/1981 | Bauer et al. | 174/65 R |
| 4,323,725 | 4/1982 | Müller | 174/65 R |

Primary Examiner—A. T. Grimley
Assistant Examiner—D. A. Tone
Attorney, Agent, or Firm—David M. Keay; Jerry F. Janssen

[57] ABSTRACT

Electrical wiring box arrangements include a wiring box, and a cable clamp device which mounts rotatably in a wall of the box adjacent to a knockout region. The cable clamp device provides a cable engaging surface which moves toward the cable as the clamp device is rotated. A non-metallic sheathed cable passing through a knockout opening in one wall of the wiring box is clamped between the edge of the knockout opening and the cable engaging surface of the clamp device mounted in a second wall of the box forming an angle with the wall having the knockout opening.

11 Claims, 20 Drawing Figures

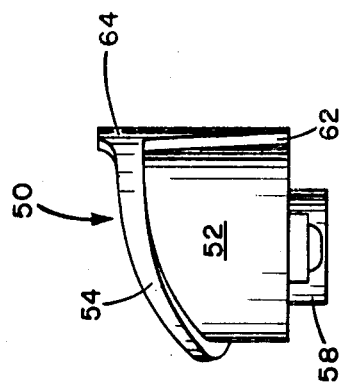
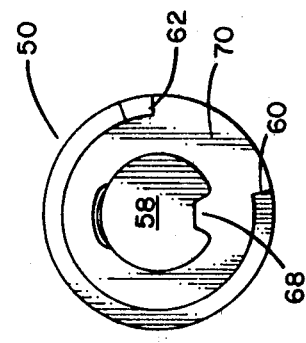
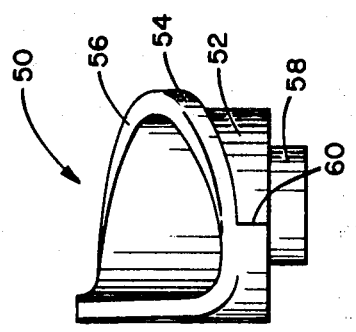
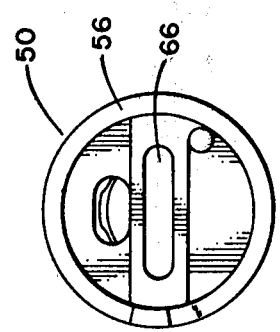
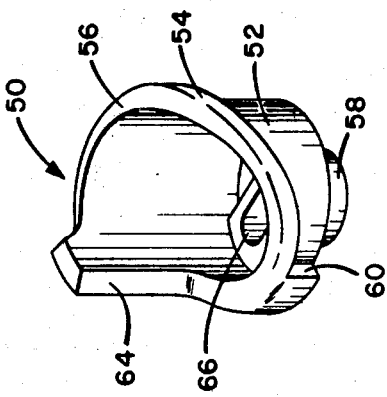

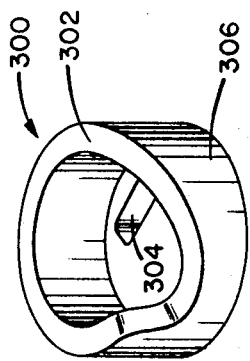
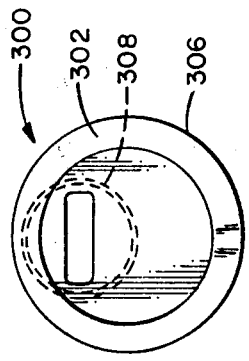
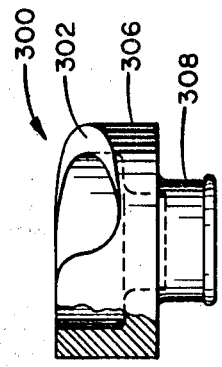
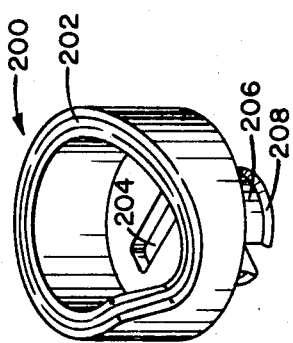
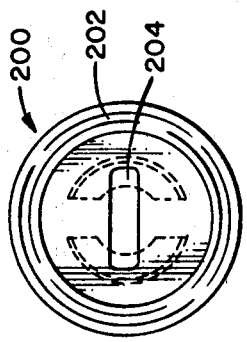
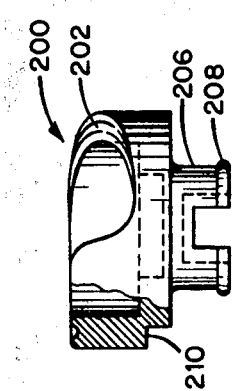
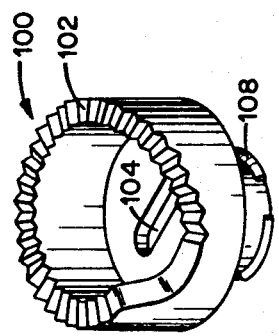
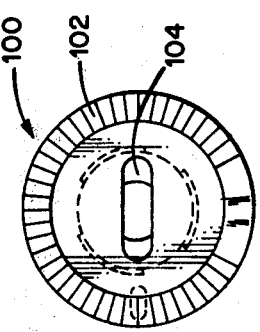
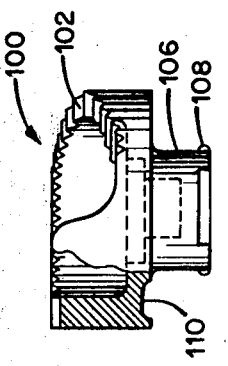

ELECTRICAL WIRING BOX ARRANGEMENTS

BACKGROUND OF THE INVENTION

This invention is related to electrical wiring boxes and electrical cable clamp devices. More particularly, it is concerned with wiring boxes having rotatably mounted cable clamping devices for use with non-metallic sheathed electrical cable.

To relieve strain upon wiring connections made to wiring devices mounted in electrical wiring boxes, it is the general practice to clamp the cable at the point where it enters the wiring box. A variety of cable clamping devices are known in the art. Previously known types of clamp devices are generally of a type which snaps into a knockout opening in the wiring box wall, or of a type which attaches to a wall of the box by means of a screw or bolt.

SUMMARY OF THE INVENTION

Improved electrical wiring box arrangements in accordance with this invention include a wiring box and a cable clamp device which mounts rotatably in a wall of the wiring box adjacent to a knockout opening. Rotation of the clamp device secures, between the clamp device and the edge of a knockout opening, a non-metallic sheathed cable which passes through the knockout opening.

The wiring box includes a wall structure defining front-to-rear walls and a rear wall therebetween which in combination define a chamber within the box having a forward facing opening. The wall structure includes a first wall provided with a frangible knockout region which is removable to provide a knockout opening adapted to receive a non-metallic sheathed electrical cable. A second wall, forming an angle with the first wall provides an attachment receiving means for rotatably mounting the cable clamp device to the box wall structure adjacent to the knockout region.

The cable clamp device comprises a generally cylindrical member having a base portion provided with attachment means for coacting with the attachment receiving means of the wiring box wall structure for rotatably mounting the clamp to the box wall structure. The cable clamp device is further provided with a cable engaging surface and means for urging, generally in a direction along the axis of the cylindrical clamp member, the cable engaging surface against a cable inserted in the knockout opening of the box wall structure.

A non-metallic sheathed electrical cable passing through the knockout opening of the wiring box having the cable clamp device attached thereto passes between the edge of the wall structure defining the knockout opening and the cable engaging surface of the clamp device. Rotation of the clamp device urges the cable engaging surface of the clamp device against the cable, in turn urging the cable against the edge of the knockout opening to secure the cable.

BRIEF DESCRIPTION OF THE DRAWING

In the drawing:

FIGS. 2 and 2a–2d are various views of one embodiment of a cable clamp device in accordance with the present invention: FIG. 2 is a perspective view; FIGS. 2a and 2b are lateral views;

FIG. 2c is the top view; and FIG. 2d is the bottom view.

FIGS. 5, 5a and 5b are perspective, top, and partially cut-away lateral views, respectively, of a cable clamp device in accordance with an alternative embodiment of the invention.

FIGS. 6, 6a and 6b are perspective, top, and partially cut-away lateral views, respectively, of a cable clamp device in accordance with an alternative embodiment of the invention.

FIGS. 7, 7a and 7b are perspective, top, and partially cut-away lateral views, respectively, of a cable clamp device in accordance with an alternative embodiment of the invention.

For a better understanding of the present invention, together with other and further objects, advantages and capabilities thereof, reference is made to the following disclosure and appended claims in connection with the above-described drawing figures.

DESCRIPTION OF THE PREFERRED EMBODIMENTS

Figure 1:
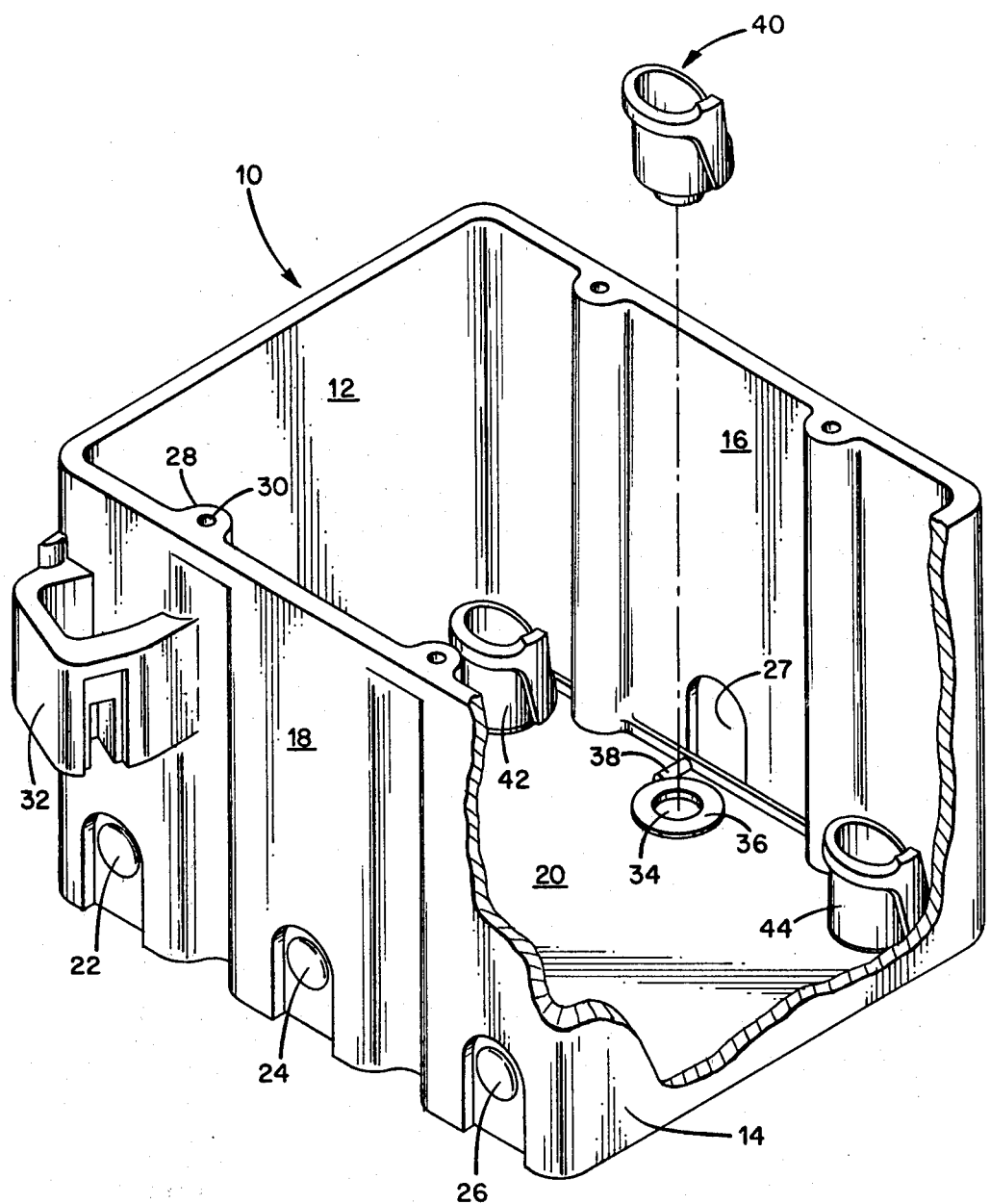
FIG. 1 is a partially cut-away perspective view of an electrical wiring box arrangement in accordance with one aspect of the present invention.

Referring to FIG. 1, there is shown a preferred embodiment of an electrical wiring box arrangement in accordance with the present invention. The wiring box arrangement 10, preferably fabricated of a thermoplastic or thermosetting plastic material by conventional molding techniques, comprises a wall structure of side walls 12, 14, 16, and 18 which, together with rear wall 20, define a box chamber adapted to receive a wiring device such as a receptacle or switch (not shown). Alternatively, no device need be installed in the box when it is employed as a wiring junction box. In either application, the wiring devices or box cover plate are attached to the box wall structure by screws or bolts driven into threaded holes 30 in bosses 28 in the box walls. The wiring box wall structure may optionally be provided with integrally molded nail-up lugs 32. Thin, frangible knockout regions 22, 24, and 26 in the wall structure are removed by a tool such as a screwdriver to provide knockout openings, such as 27, to permit the passage of an electrical cable through the box wall structure into the box chamber.

Apertures in the box wall structure, typified by opening 34 in rear wall 20, are adapted to receive an attachment post member on the cable clamp device 40 to rotatably mount the clamp device to the wall 20. The attachment receiving aperture 34 may be provided with a raised boss 36 forming a ring around the aperture. Raised protrusions 38 adjacent to each attachment receiving aperture 34 serve to limit the degree of rotation of the cable clamp device 40 when the latter is inserted in the aperture as described further below.

Details of the preferred embodiment of the cable clamp device can be seen by reference to FIGS. 2a–2c. The clamp device 50 is generally cylindrical in configuration with a flat base portion 70 having an attachment post 58. An upstanding wall portion 52 of the clamp device 50 terminates at its upper edge or surface in a ramped or cammed edge 54. The surface 56 of the ramped edge 54 provides a cable engaging surface. A tool receiving slot 66 is adapted to receive the bit of a screwdriver or a similar tool to rotate the clamp device when the clamp is mounted to the wiring box wall structure.

Indentations 60 and 62 in the base portion 70 of the clamp device interact with the raised protrusion (shown as 38 in FIG. 1) to permit rotation of the clamp device through only a fraction of its total circumference when mounted to the wiring box wall structure. An indentation 68 is molded in the attachment post 58 of the clamp device to permit a tight snap fit when the clamp device is inserted in the attachment receiving aperture of the wiring box wall structure.

Figure 3:
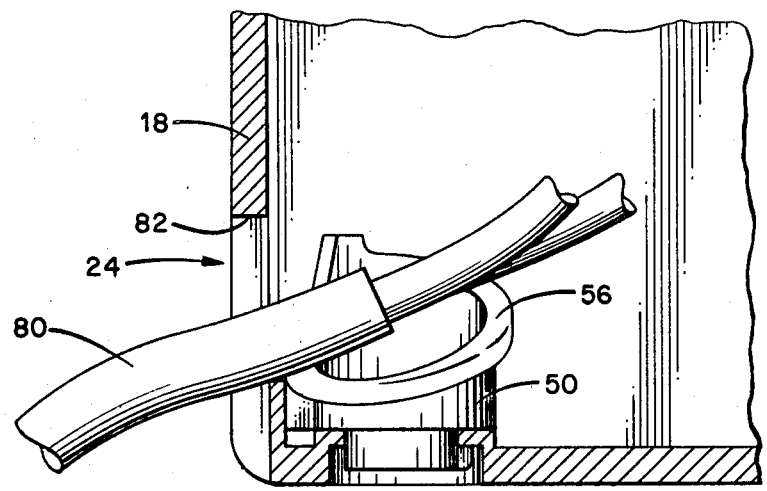
FIGS. 3 and 4 are partially cut-away side views of a wiring box arrangement of the present invention illustrating the use of the cable clamp device embodiment of FIGS. 2 and 2a–2d to clamp a non-metallic sheathed cable in a knockout opening of the wiring box.
Figure 4:
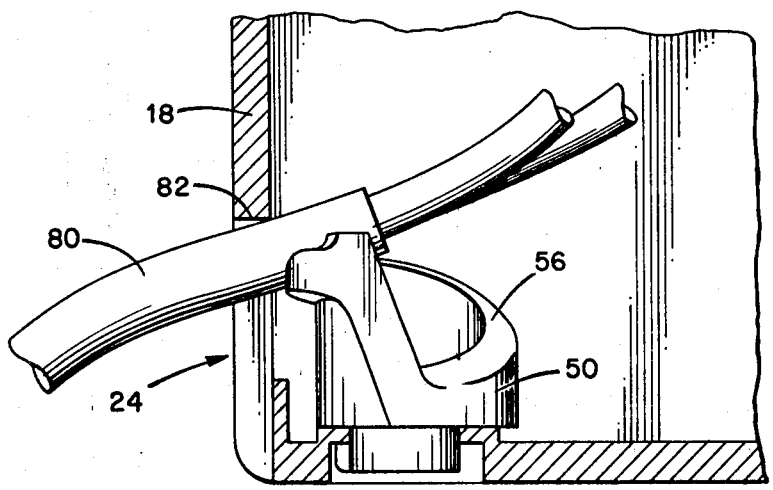

Referring to FIGS. 3 and 4, the interactive functioning of the wiring box wall elements and the clamp device elements clearly can be seen. Wiring cable 80 is shown passing through knockout opening 24 in box wall 18 where the cable passes between the cammed cable engaging surface 56 of the clamp device 50 and the edge 82 of the box wall defining the knockout opening. As shown in FIG. 4, the clamp device has been rotated to urge the cable upward against the edge 82 of the box wall 18, securing the cable.

Various alternative embodiments of the cable clamp device of wiring box arrangements are shown in FIGS. 5-8b. For example, in the embodiment shown in FIGS. 5, 5a and 5b the ramped or cammed surface 102 of the clamp device 100 is serrated to insure a firm grip with the cable sheath. A circular slot or indentation 110 in the base portion of the clamp device mates with the raised boss ring (element 36 of FIG. 1) to insure tracking of the clamp device as it is rotated during use, and protrusions 108 of the attachment post 106 insure a tight snap fit of the attachment post in the attachment receiving aperture of the box wall.

FIGS. 6, 6a and 6b illustrate the embodiment where the cable engaging surface 202 of the clamp device 200 comprises a raised ridge running the length of the ramp on the clamp device. In the embodiment shown in FIGS. 6, 6a and 6b, the cable engaging surface of the clamp device consists of a pair of parallel raised ridges on the upper cammed surface of the cable clamp device. This embodiment also illustrates the division of the attachment post into segments 206 and 208 which independently flex to permit a tight snap fit of the attachment post into the attachment receiving aperture of the box wall. Indentation 210 permits the base portion of the clamp device to fit inside the raised boss ring 36 of the box wall structure when the clamp is attached to the box wall.

FIGS. 7, 7a and 7b illustrate the embodiment where the attachment post 308 of the clamp device 300 is disposed eccentrically on the base portion of the clamp device. Attachment of the clamp device of this embodiment of the invention to the box wall structure and subsequent rotation of the clamp device causes the upstanding wall of the clamp device to move towards or away from the box wall providing the knockout opening.

Figure 8:
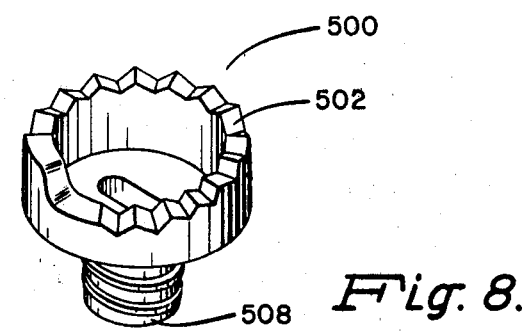
FIGS. 8, 8a and 8b are perspective, top, and partially cut-away lateral views, respectively, of a cable clamp device in accordance with an alternative embodiment of the invention.
Figure 8A:
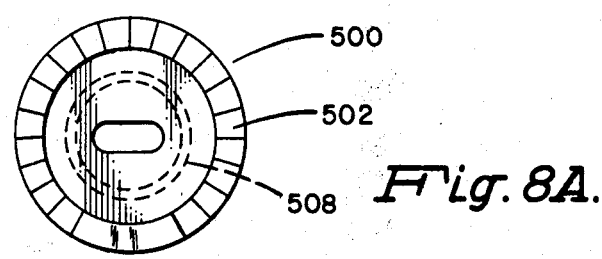
Figure 8B:
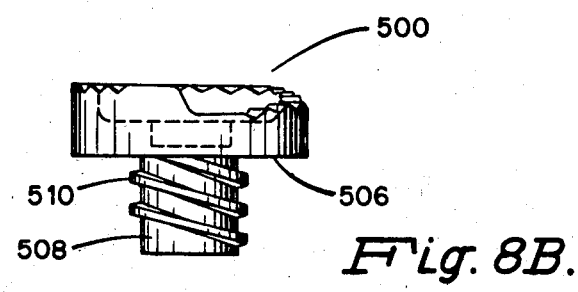

In the embodiments illustrated in FIGS. 8, 8a and 8b, the cable engaging surface 502 of the clamp device 500 is not ramped, but is generally co-parallel with the base 506. By generally co-parallel it is meant that the average plane of the upper or cable engaging surface of the clamp device is generally co-parallel with the plane of the base of the device, although as shown in the embodiment illustrated in FIGS. 8, 8a-8b, the cable engaging surface may be serrated or otherwise configured to insure secure gripping of the cable sheath. The attachment post 508 of the clamp device is provided with threads 510 which mate correspondingly with threads molded in the interior wall surface of the wiring box attachment receiving aperture 34. Counterclockwise rotation of the clamp member 500 causes the entire member to move away from the box wall to which it is attached, urging a cable (inserted through a knockout opening of the box and over the cable engaging surface 502 of the clamp device) toward the edge of the knockout opening, firmly securing the cable.

While there have been shown and described what are at present believed to be the preferred embodiments of the present invention, it will be obvious to one skilled in the art that various modifications may be made therein without departing from the scope of the invention as defined by the appended claims.

What is claimed is:

1. An electrical wiring box arrangement including a wiring box and cable clamp device;
said wiring box comprising:
a wall structure defining front-to-rear walls and a rear wall therebetween which in combination define a chamber having a forward facing opening;
said wall structure including a first wall provided with a frangible knockout region for providing a knockout opening adapted to receive a non-metallic sheathed cable, and a second wall forming an angle with said first wall, said second wall provided with attachment receiving means for rotatably mounting said cable clamp device to said second wall adjacent to said knockout region in said first wall;
said cable clamp device comprising:
a generally cylindrical member having a base portion provided with attachment means for coacting with said attachment receiving means of said wiring box wall structure to rotatably mount said cable clamp member to said box wall structure;
a cable engaging surface; and
means for urging, generally in a direction along the axis of said cylindrical member, said cable engaging surface against an electrical cable inserted through said knockout opening in said wiring box wall structure;
whereby a non-metallic sheathed electrical cable passing through said knockout opening of said wiring box having said cable clamp device attached thereto passes between the edge of the wall structure defining said knockout opening and the cable engaging surface of said clamp member, and upon rotation of said clamp member is urged against said edge, securing said cable.

2. An electrical wiring box arrangement in accordance with claim 1 wherein said means for urging comprises an upstanding wall portion of said cable clamp device having a ramped upper surface.

3. An electrical wiring box arrangement in accordance with claim 2 wherein said cable engaging surface of said cable clamp member comprises serrations on said ramped upper surface.

4. An electrical wiring box arrangement in accordance with claim 3 wherein said cable engaging surface of said cable clamp member comprises a raised ridge on said ramped upper surface.

5. An electrical wiring box arrangement in accordance with claim 1 wherein said attachment receiving means of said wiring box wall structure comprises an aperture in said wall structure adapted to receive for rotatable mounting, said attachment means of said cable clamp member.

6. An electrical wiring box arrangement in accordance with claim 5 wherein said attachment receiving means further includes a raised boss ring surrounding said aperture.

7. An electrical wiring box arrangement in accordance with claim 6 wherein said base portion of said cable clamp device further includes an indentation adapted to coact with said raised boss whereby said indentation tracks said raised boss ring upon rotation of said cable clamp member.

8. An electrical wiring box arrangement in accordance with claim 5 wherein said attachment means of said cable clamp device comprises a post member disposed on said base portion of said cable clamp device adapted to coact with said aperture to rotatably mount said cable clamp device to said wiring box wall structure.

9. An electrical wiring box arrangement in accordance with claim 8 wherein said post member is disposed eccentrically on said base portion of said cable clamp member.

10. An electrical wiring box arrangement in accordance with claim 1 wherein said attachment receiving means of said wiring box wall structure comprises a threaded aperture in said wall structure adapted to receive for rotatable mounting, said attachment means of said cable clamp device.

11. An electrical wiring box arrangement in accordance with claim 10 wherein said means for urging comprises a threaded post member disposed on said base portion of said cable clamp member, said threaded post member adapted to coact with said threaded aperture of said wiring box structure whereby counterclockwise rotation of said cable clamp device causes said cable engaging surface to move away from said wall structure having said attachment receiving means.

* * * * *